US012012923B1

(12) United States Patent
Isaac et al.

(10) Patent No.: US 12,012,923 B1
(45) Date of Patent: Jun. 18, 2024

(54) POWER STORAGE SYSTEM

(71) Applicants: Barry Isaac, Los Angeles, CA (US); Rafi Isaac, Beverly Hills, CA (US)

(72) Inventors: Barry Isaac, Los Angeles, CA (US); Rafi Isaac, Beverly Hills, CA (US)

( * ) Notice: Subject to any disclaimer, the term of this patent is extended or adjusted under 35 U.S.C. 154(b) by 0 days.

(21) Appl. No.: 18/118,652

(22) Filed: Mar. 7, 2023

(51) Int. Cl.
*F03B 13/26* (2006.01)

(52) U.S. Cl.
CPC .......... *F03B 13/26* (2013.01); *F05B 2210/18* (2013.01); *F05B 2220/706* (2013.01); *F05B 2240/917* (2013.01); *F05B 2260/422* (2020.08); *F05B 2270/18* (2013.01)

(58) Field of Classification Search
CPC ................ F03B 13/26; F05B 2260/422; F05B 2210/18; F05B 2220/706; F05B 2240/917; F05B 2270/18
See application file for complete search history.

(56) References Cited

U.S. PATENT DOCUMENTS

2016/0160835 A1* 6/2016 Abu-Al-Rubb ......... F03B 13/00 416/85
2022/0412301 A1* 12/2022 Shintani .................... B60F 5/00

* cited by examiner

*Primary Examiner* — Viet P Nguyen
(74) *Attorney, Agent, or Firm* — QuickPatents; Kevin Prince

(57) ABSTRACT

The present invention is a power storage system for use in a body of water, including a cable strung between at least one lower pulley and an upper pulley. A tank arrangement includes an outer tank disposed in the body of water and having an open bottom end, the outer tank fixed with the cable and configured to move between a lowered position and a raised position. An inner tank is disposed within the outer tank and includes an air compressor configured to move air from the outer tank to the inner tank and a dump valve configured to release compressed air within the inner tank into the outer tank. A generator produces electricity as the air within the inner tank is released to cause the outer tank to rise. A second tank arrangement is fixed to an opposing side of the cable.

14 Claims, 8 Drawing Sheets

POWER STORAGE SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to energy storage, and more particularly to compressed air buoyancy energy storage device for use in a body of water.

BACKGROUND

Renewable energy sources are notoriously inconsistent, such as during cloudy days that affect solar energy production and windless times that affect wind energy production. During such times it would be beneficial to have stored a portion of the energy produced in order to provide energy during non-productive times. Such stored energy could then be used to make up for a total loss of production, or even a dip in production, so that power customers enjoy reliable, uninterrupted service.

Therefore, there is a need for a device that provides an efficient means of storing energy until needed at a later time. Such a needed invention would be scalable and use portions of a body of water that are otherwise unused. Such a needed device would be safe for marine animals and would have a minor environmental impact. The present invention accomplishes these objectives.

SUMMARY OF THE INVENTION

The present device is a power storage system for use in a body of water, such as a lake or ocean. A cable is strung between at least one lower pulley and an upper pulley. The cable has an upper end and a lower end. Preferably the upper pulley is above a surface of the body of water on a stable platform, such as a buoy or floating platform.

A tank arrangement includes an outer tank disposed in the body of the water and having an open bottom end. The outer tank is fixed with the cable and configured to move between a lowered position and a raised position. The outer tank is of a weight so as to sink in the body of water when the outer tank has a minimum buoyancy, and to rise in the body of water when the outer tank has a maximum buoyancy. As such, the outer tank is preferably made with a strong metal material such as stainless steel.

An inner tank is disposed within the outer tank. The inner tank has at least one port through which the inner tank is in fluid communication with the outer tank. The at least one port includes an air compressor configured to move air from the outer tank to the inner tank through the at least one port. A dump valve is configured to release compressed air within the inner tank into the outer tank. The air compressor runs on power supplied to the power storage system, and the dump valve is controlled by an electronic controller that also runs on power supplied to the power storage system.

At least one generator is fixed with the upper pulley and is configured to produce electricity when the outer tank and the cable move between the lowered position and the raised position. At least a portion of the electricity so generated is used to deliver power from the power storage system. The at least one generator is configured to produce electricity no matter which direction the cable moves, through a gearing arrangement (not shown) or other means as is known in the art. The power supplied to the power storage system is banked as potential energy in the form of the compressed air, which is released into the outer tank when the energy is needed again from the power storage system.

As such, in use, with the outer tank in the raised position, and with the inner tank at a minimum internal air pressure, the outer tank is at the maximum buoyancy and is substantially filled with air. The air compressor is activated in a compression mode to move air from the outer tank to the inner tank. This increases the internal air pressure of the inner tank and reduces the amount of air and the buoyancy of the outer tank. The weight of the outer tank pulls the outer tank downwardly, the cable thereby rotating the generator at the upper pulley to produce electricity. Water enters the outer tank through the open bottom end thereof, such that upon reaching the lowered position the outer tank obtains the minimum buoyancy.

Thereafter in a decompression mode, the dump valve is opened to allow air within the inner tank to exit the inner tank through the at least one port. The air entering the outer tank displaces the water in the outer tank out through the open bottom end thereof. The buoyancy of the outer tank is thereby increased to overcome the weight of the outer tank, the cable rotating the generator at the upper pulley to produce electricity until the outer tank reaches the raised position. The power storage system is then ready to move into the compression mode again.

In a simple embodiment of the invention, the upper pulley includes an upper take-up reel configured to wind the upper end of the cable when the outer tank is in the raised position. Similarly, the at least one lower pulley includes a lower take-up reel configured to wind the lower end of the cable when the outer tank is in the lowered position. In such an embodiment, the cable is a loop of cable, looping around both the upper pulley and the lower pulley.

In preferred embodiments, the tank arrangement is designated as the first tank arrangement and is fixed with one portion of the cable. A second tank arrangement, similar to the first tank arrangement, is fixed with an opposing portion of the cable. As such, when the first tank arrangement is in the raised position, the second tank arrangement is in the lowered position. Similarly, when the first tank arrangement is in the lowered position, the second tank arrangement is in the raised position.

The present invention is a system that provides an efficient means of storing energy until needed at a later time. The present system is scalable and uses portions of a body of water that are otherwise unused and therefore inexpensive to purchase or lease. The present system is safe for marine animals and introduces minor environmental impact where installed. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
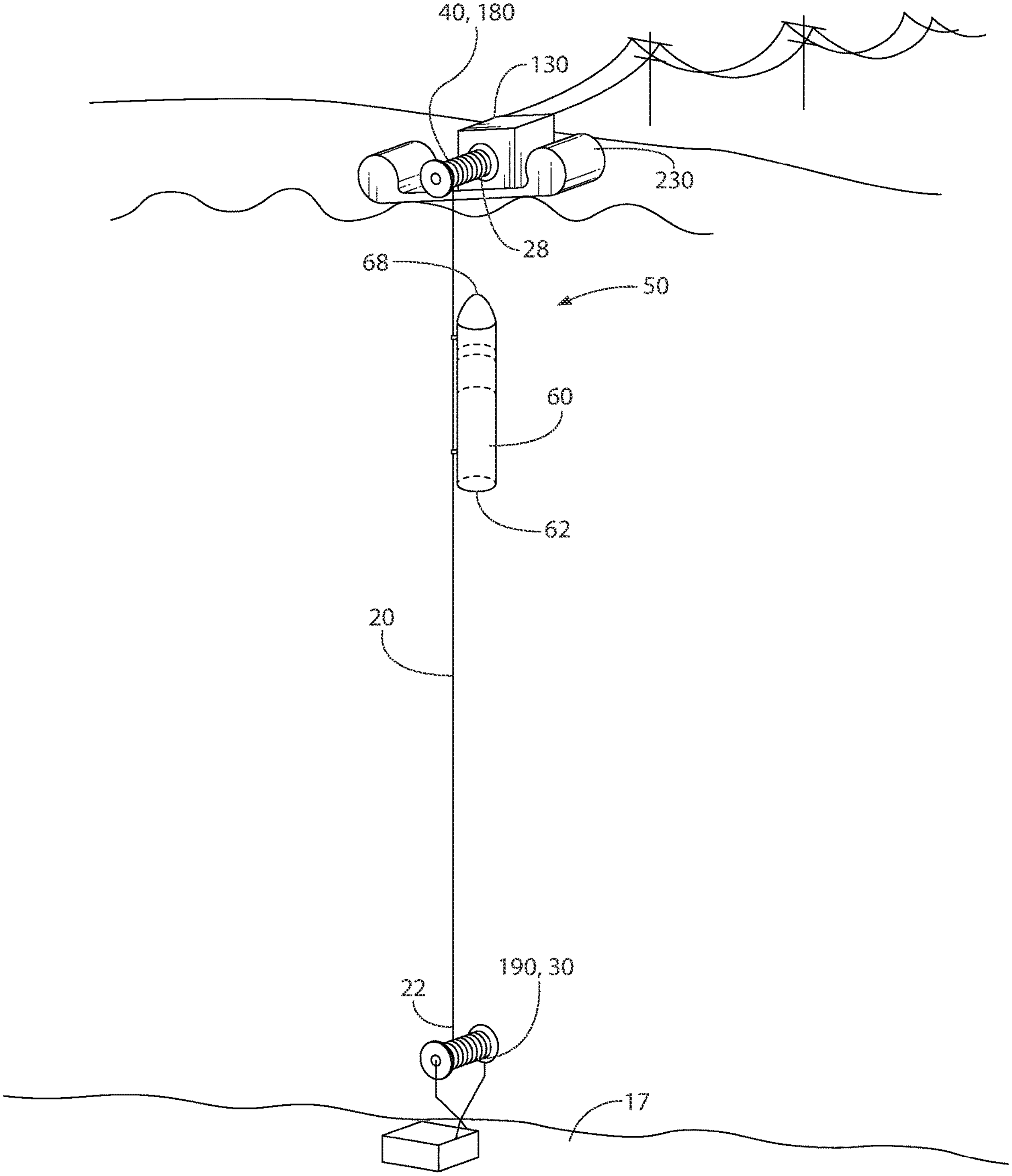
FIG. 1 is a diagram of a first embodiment of the invention, illustrating a tank arrangement fixed with a cable that spans from a lower pulley to an upper pulley and generator.
Figure 2A:
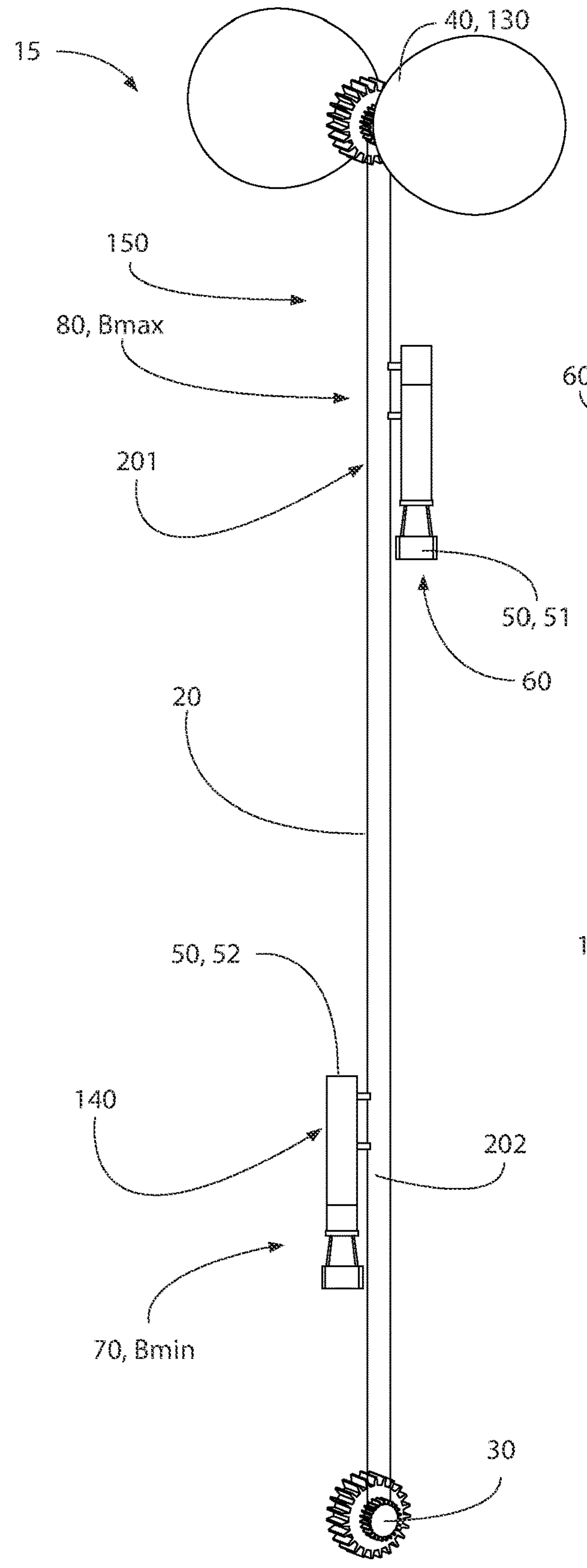
FIG. 2A is a diagram of a preferred embodiment of the invention, illustrating two of the tank arrangements operating in opposing phases with a looped cable, a first of the tank arrangements in a raised position.
Figure 3A:
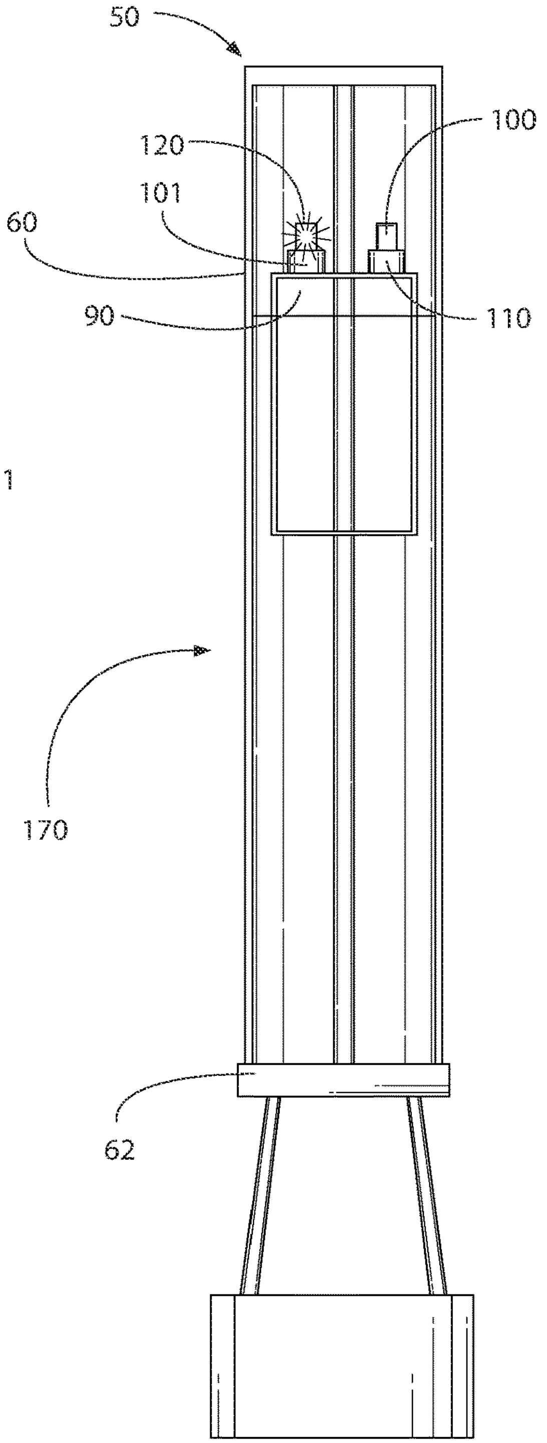
FIG. 3A is a diagram of the invention, illustrating the first tank arrangement in the raised position and having a maximum buoyancy.
Figure 2B:
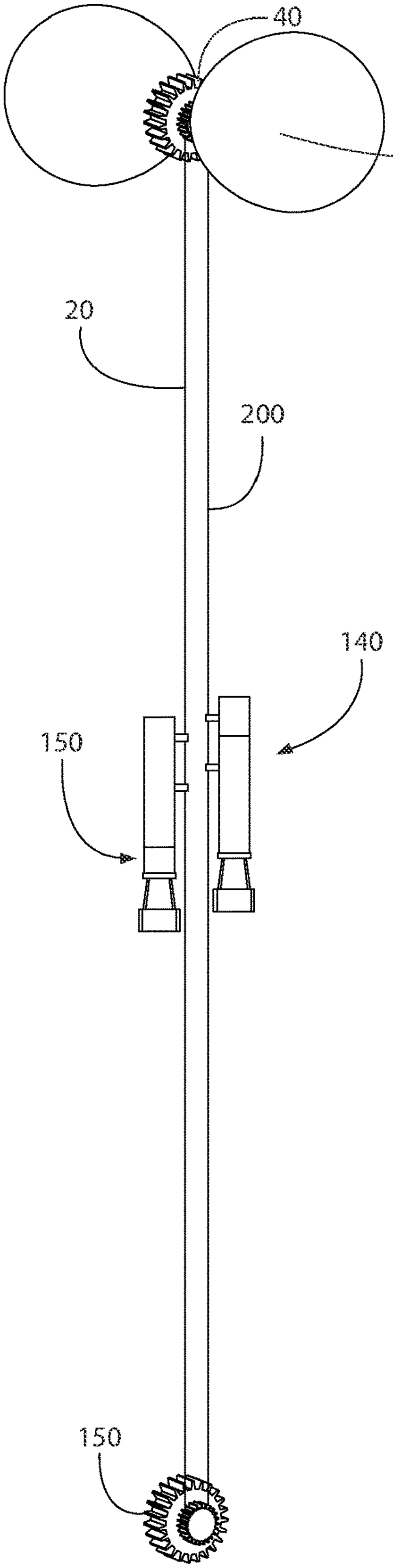
FIG. 2B is a diagram of the embodiment of FIG. 2A, illustrating the two tank arrangements passing each other mid-way between raised positions and lowered positions of the tank arrangements.
Figure 3B:
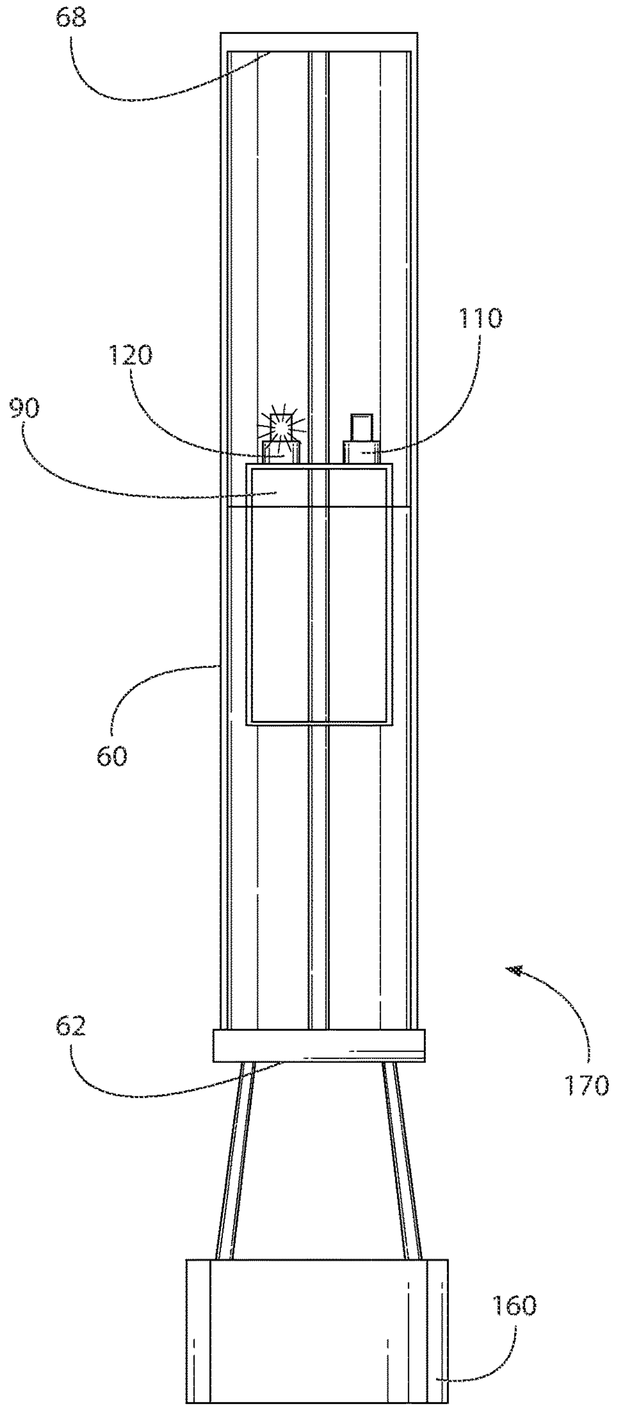
FIG. 3B is a diagram of the invention, illustrating the first tank arrangement mid-way through expelling water within an outer tank thereof.
Figure 2C:
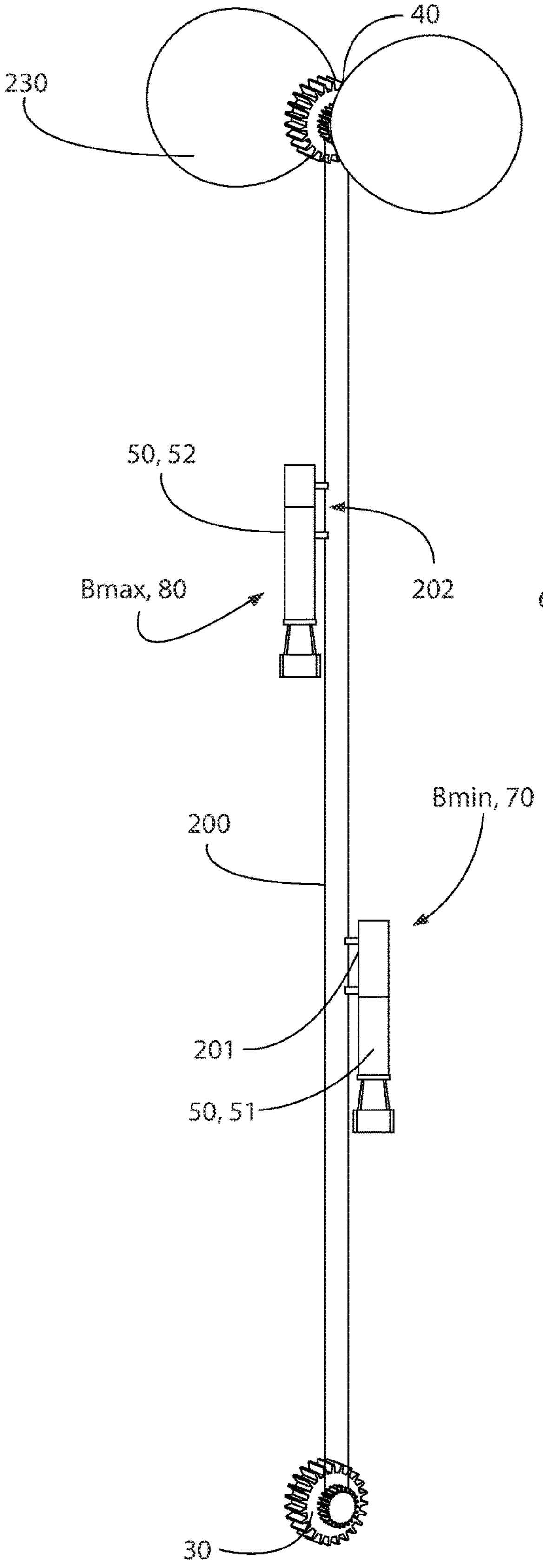
FIG. 2C is a diagram of the embodiment of FIG. 2A, illustrating the first tank arrangement in a lowered position.
Figure 3C:
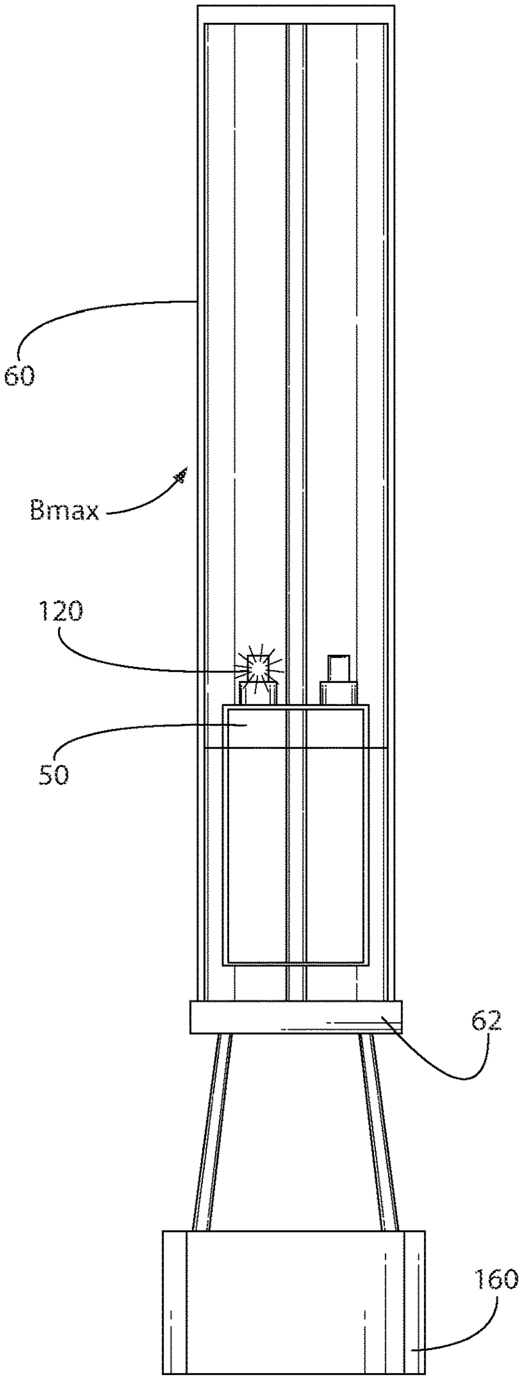
FIG. 3C is a diagram of the invention, illustrating the first tank arrangement in a lowered position.
Figure 2D:
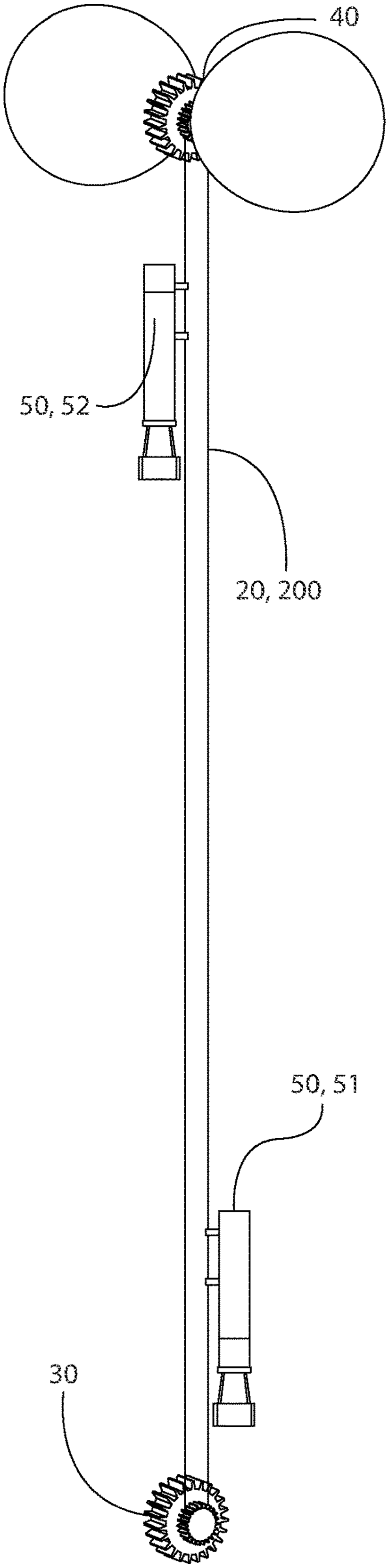
FIG. 2D is a diagram of the embodiment of FIG. 2A, illustrating the first tank arrangement starting to rise from the lowered position of FIG. 2C.
Figure 3D:
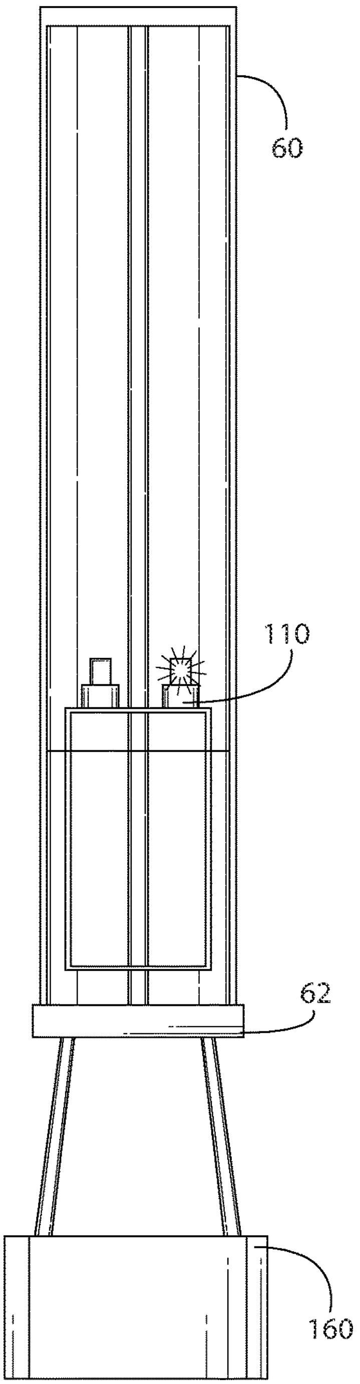
FIG. 3D is a diagram of the invention, illustrating the first tank arrangement starting to rise from the lowered position of FIG. 3C.
Figure 2E:
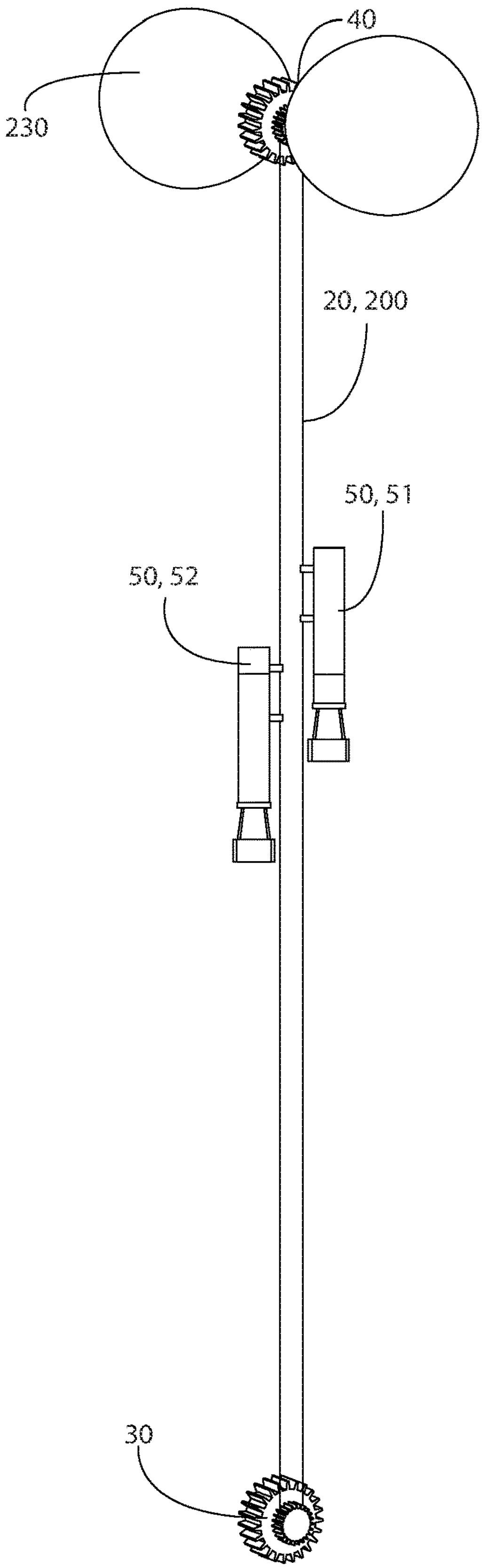
FIG. 2E is a diagram of the embodiment of FIG. 2A, illustrating the two tank arrangements passing each other again mid-way between raised positions and lowered positions of the tank arrangements.
Figure 3E:
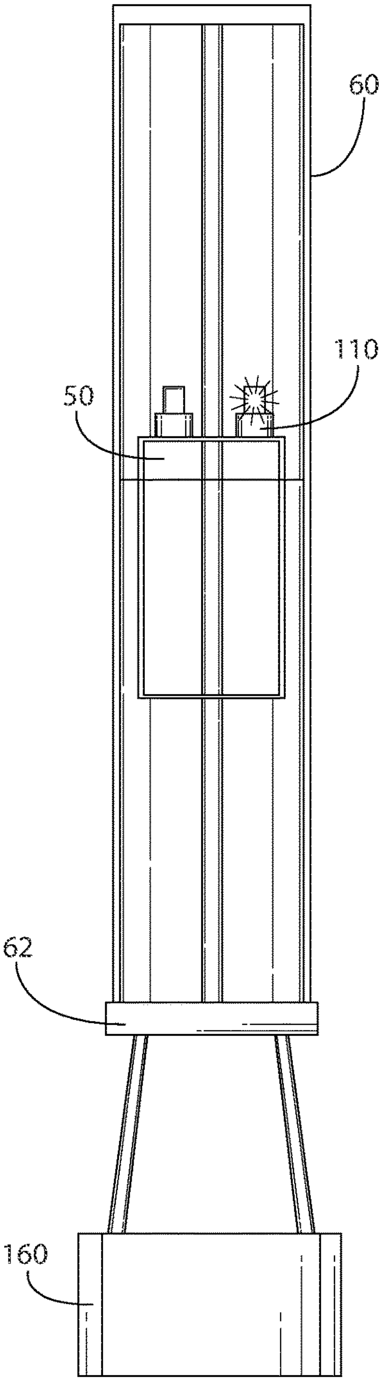
FIG. 3E is a diagram of the invention, illustrating the first tank arrangement filling with water on the way up towards the raised position.
Figure 2F:
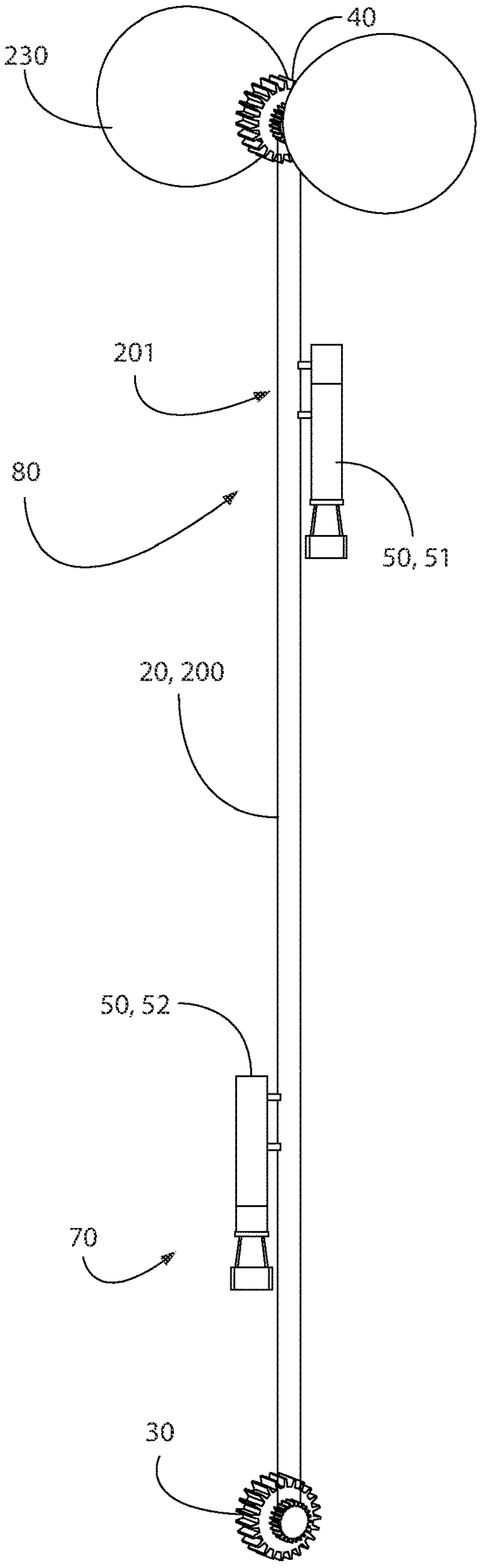
FIG. 2F is a diagram of the embodiment of FIG. 2A, illustrated with the first tank arrangement again in the raised position.
Figure 3F:
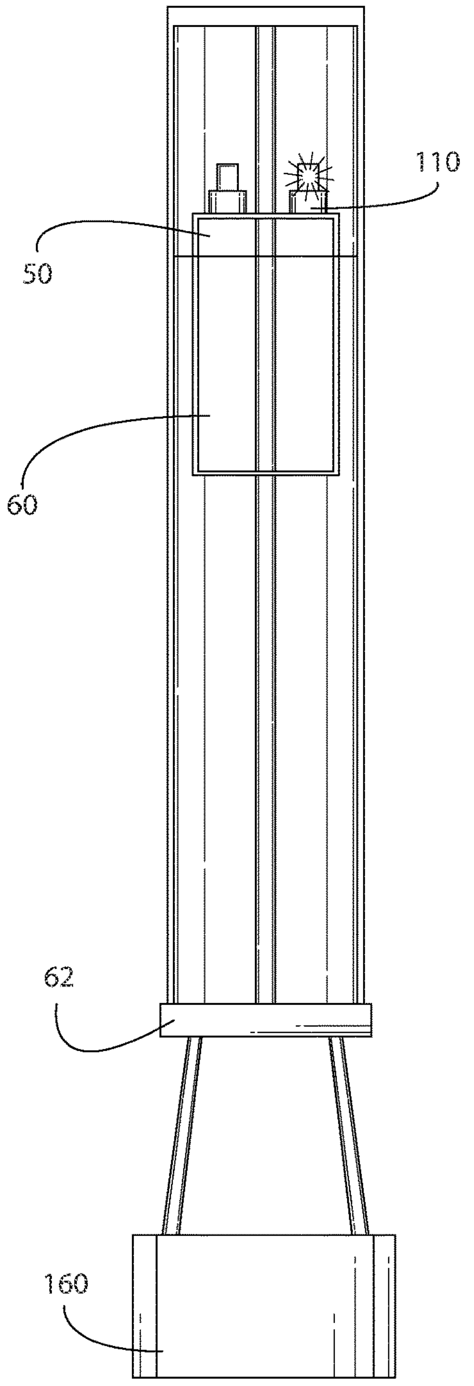
FIG. 3F is a diagram of the invention, illustrated with the first tank arrangement again in the raised position.

FIGS. 1-2F illustrate a power storage system 10 for use in a body of water 15, such as a lake or ocean. A cable 20 is strung between at least one lower pulley 30 and an upper pulley 40. The cable 20 has an upper end 28 and a lower end 22.

A tank arrangement 50 includes an outer tank 60 disposed in the body of the water 15 and having an open bottom end 62. The outer tank 60 is fixed with the cable 20 and configured to move between a lowered position 70 and a raised position 80. The outer tank 60 is of a weight so as to sink in the body of water 15 when the outer tank 60 has a minimum buoyancy $B_{min}$, and to rise in the body of water 15 when the outer tank 60 has a maximum buoyancy $B_{max}$. As such, the outer tank 60 is preferably made with a strong metal material such as stainless steel.

An inner tank 90 is disposed within the outer tank 60. The inner tank 90 has at least one port 100 through which the inner tank 90 is in fluid communication with the outer tank 90. The at least one port 100 includes an air compressor 110 configured to move air from the outer tank 60 to the inner tank 130 through the at least one port 100. Ambient pressure at the air compressor 110 and the at least one port 100 is relatively high due to the pressure of the water entering the outer tank 60 through the open bottom end 62, and thus relatively little electricity is needed to run the air compressor 110. An electronic dump valve 120 is configured to release compressed air within the inner tank 90 into the outer tank 60. The air compressor 110 runs on power supplied to the power storage system 10, and the dump valve 60 is controlled by an electronic controller (not shown) that also runs on power supplied to the power storage system 10. Electric lines (not shown) are connected to the air compressor 110 to selectively power the air compressor 110 when needed, as is known in the art. The dump valve 60 may, in some embodiments, provide an additional generator 130 for converting kinetic energy of the compressed air escaping into the outer tank 60 into electricity.

At least one generator 130 is fixed with the upper pulley 40 and is configured to produce electricity when the outer tank 60 and the cable 20 move between the lowered position 70 and the raised position 80. At least a portion of the electricity so generated is used to deliver power from the power storage system 10. The at least one generator 130 is configured to produce electricity no matter which direction the cable 20 moves, through a gearing arrangement (not shown) or other means as is known in the art. The power supplied to the power storage system 10 is banked as potential energy in the form of the compressed air, which is released into the outer tank 60 when the energy is needed again from the power storage system 10.

As such, in use, with the outer tank 60 in the raised position 80, and with the inner tank 90 at a minimum internal air pressure, the outer tank 60 is at the maximum buoyancy $B_{max}$ and is substantially filled with air. The air compressor 110 is activated in a compression mode 140 to move air from the outer tank 60 to the inner tank 90. This increases the internal air pressure of the inner tank 90 and reduces the amount of air and the buoyancy of the outer tank 60. The weight of the outer tank 60 pulls the outer tank 60 downwardly, the cable thereby rotating the generator 130 at the upper pulley 40 to produce electricity. Water enters the outer tank 60 through the open bottom end 62 thereof, such that upon reaching the lowered position 70 the outer tank 60 obtains the minimum buoyancy $B_{min}$.

Thereafter in a decompression mode 150, the dump valve 120 is opened to allow air within the inner tank 90 to exit the inner tank 60 through the at least one port 100. The air entering the outer tank 60 displaces the water in the outer tank 60 out through the open bottom end 62 thereof. The buoyancy of the outer tank 60 is thereby increased to overcome the weight of the outer tank 60, the cable 20 rotating the generator 110 at the upper pulley 40 to produce electricity until the outer tank 60 reaches the raised position 80. The power storage system 10 is then ready to move into the compression mode 140 again.

In some embodiments, the outer tank 60 further includes an auxiliary weight 160 fixed proximate the open bottom end 62 thereof, such that the outer tank 60 is urged to remain in in an upright position 170 within the body of water 15. The auxiliary weight 160 cooperates with the weight of the outer tank 60 so as to sink in the body of water 15 when the outer tank 60 has the minimum buoyancy $B_{min}$, and so as to rise in the body of water 15 when the outer tank 60 has the maximum buoyancy $B_{max}$.

In a simple embodiment of the invention, illustrated in FIG. 1, the upper pulley 40 includes an upper take-up reel 180 configured to wind the upper end 28 of the cable 20 when the outer tank 60 is in the raised position 60. Similarly, the at least one lower pulley 30 includes a lower take-up reel 190 configured to wind the lower end 22 of the cable 20 when the outer tank is in the lowered position. In such an embodiment, the cable 20 is a loop 200 of cable 20, looping around both the upper pulley 40 and the lower pulley 30.

In preferred embodiments, the tank arrangement 50 is designated as the first tank arrangement 51 and is fixed with one portion of the cable 201 (FIGS. 2A-3F). A second tank arrangement 52, similar to the first tank arrangement 51, is fixed with an opposing portion 202 of the cable 20. As such, when the first tank arrangement 51 is in the raised position 80, the second tank arrangement 52 is in the lowered position 70. Similarly, when the first tank arrangement 51 is in the lowered position 70, the second tank arrangement 52 is in the raised position 80.

Figure 4:
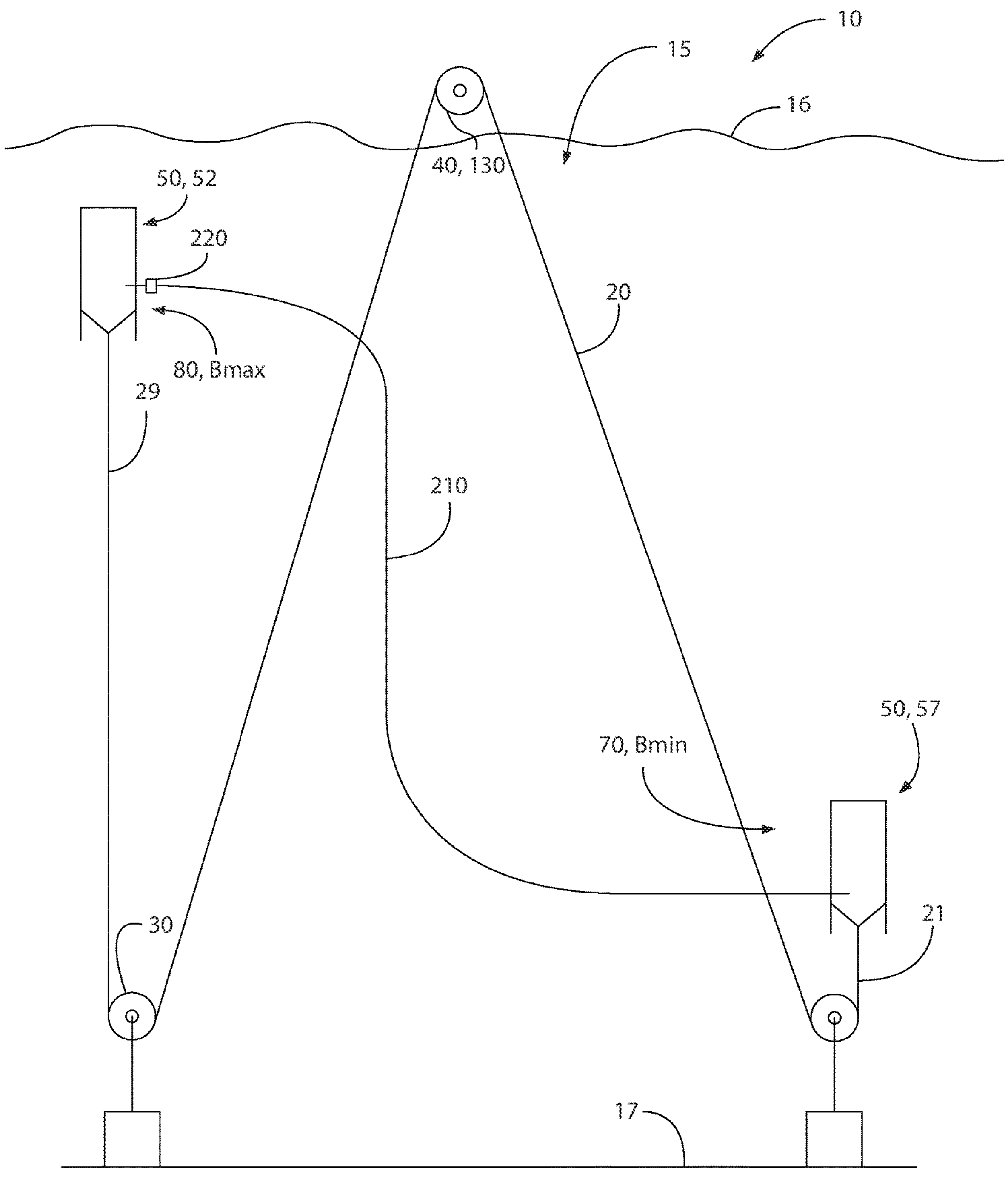
FIG. 4 is a diagram of an alternate embodiment of the invention, wherein each tank arrangement is fixed with one end of the cable.

In an alternate embodiment of the invention, the first tank arrangement 51 is fixed with the first end 21 of the cable 20. The second tank arrangement 52 is fixed with the opposing second end 29 of the cable 20 such that when the first tank arrangement 51 is in the raised position 80, the second tank arrangement 52 is in the lowered position 70. Similarly, when the first tank arrangement 51 is in the lowered position 70, the second tank arrangement 52 In the raised position 80. In such an embodiment the at least one lower pulley 30 is exactly two of the lower pulleys 30, and the cable 20 forms a W-shape (FIG. 4).

Preferably to reduce drag in the body of water 15, the top end 68 of the outer tank is pointed and more aquadynamic. Similarly, the open bottom end 68 of the outer tank may include pointed and more aquadynamic structure, provided water can flow from the outer tank 60 to the body of water 15 substantially unimpeded.

In some embodiments have the first tank arrangement 51 and the second tank arrangement 52, the inner tank 90 the first tank arrangement 51 and the inner tank 90 of the second tank arrangement 52 are in selective fluid communication through an air conduit 210 (FIG. 4) and an electronic valve 220. As such, air can be transferred from either of the inner tanks 90 to the other inner tank 90 by opening the electronic valve 220. A controller (not shown) may be included for controlling the electronic valve 220, the air compressors 110, the dump valve 120, and other components that may be added to the invention. The air conduit 210 may be disposed over the upper pulley 40 so that if necessary air can be introduced into either the first tank arrangement 51 or the second tank arrangement 52 from the surface 16 of the body of water 15.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A power storage system for use in a body of water, comprising:

- a cable strung between at least one lower pulley and an upper pulley;
- a tank arrangement comprising:
  - an outer tank disposed in the body of water and having an open bottom end, the outer tank fixed with the cable and configured to move between a lowered position and a raised position, the outer tank being of a weight so as to sink in the body of water when the outer tank has a minimum buoyancy and to rise in the body of water when the outer tank has a maximum buoyancy; and an inner tank disposed within the outer tank, the inner tank having at least one port through which the inner tank is in fluid communication with the outer tank, the at least one port including an air compressor configured to move air from the outer tank to the inner tank through the at least one port, and a dump valve configured to release compressed air within the inner tank into the outer tank, the air compressor running on power supplied to the power storage system;

at least one generator fixed with the upper pulley and configured to produce electricity when the outer tank and cable move between the lowered position and the raised position, at least a portion of the electricity used to deliver power from the power storage system;

whereby with the outer tank in the raised position and with the inner tank at a minimum internal air pressure, the outer tank is at the maximum buoyancy and substantially filled with air, whereupon the air compressor is activated in a compression mode to move air from the outer tank to the inner tank, increasing the internal air pressure of the inner tank and reducing an amount of air and the buoyancy of the outer tank, whereupon the weight of the outer tank pulls the outer tank downwardly, the cable rotating the generator at the upper pulley to produce electricity, water entering the outer tank through the open bottom end thereof, whereupon reaching the lowered position the outer tank having obtained the minimum buoyancy, whereupon in a decompression mode the dump valve is opened to allow air within the inner tank to exit the inner tank through the at least one port, the air entering the outer tank displacing the water in the outer tank out through the open bottom end thereof, the buoyancy of the outer tank thereby increasing to overcome the weight of the outer tank, the cable rotating the generator at the upper pulley to produce electricity until the outer tank reaches the raised position, ready to move into the compression mode once again.

2. The power storage system of claim 1 wherein the outer tank further includes an auxiliary weight fixed proximate the open bottom end, such that the outer tank is urged to remain in an upright position within the body of water, the auxiliary weight cooperating with the weight of the outer tank so as to sink in the body of water when the outer tank has the minimum buoyancy and to rise in the body of water when the outer tank has the maximum buoyancy.

3. The power storage system of claim 1 wherein the upper pulley includes an upper take-up reel configured to wind an upper end of the cable when the outer tank is in the raised position, and wherein the at least one lower pulley includes a lower take-up reel configured to wind a lower end of the cable when the outer tank is the lowered position.

4. The power storage system of claim 1 wherein the cable is a loop of cable looping around both the upper pulley and the at least one lower pulley.

5. The power storage system of claim 4 wherein the tank arrangement is fixed with one portion of the cable and designated as a first tank arrangement, the power storage system further including a second of the tank arrangements fixed with an opposing portion of the cable such that when the first tank arrangement is in the raised position, the second tank arrangement is in the lowered position, and such that when the first tank arrangement is in the lowered position, the second tank arrangement is in the raised position.

6. The power storage system of claim 5 wherein each outer tank is an elongated cylinder having a pointed, aquadynamic top end.

7. The power storage system of claim 5 wherein the inner tank of the first tank arrangement is in selective fluid communication with the inner tank of the second tank arrangement through an air conduit and an electronic valve, whereby air can be transferred from either inner tank to an other inner tank through opening the electronic valve.

8. The power storage system of claim 1 wherein the tank arrangement is fixed with a first end of the cable and designated as the first tank arrangement, the power storage system further including a second of the tank arrangements fixed with an opposing second end of the cable such that when the first tank arrangement is in the raised position, the second tank arrangement is in the lowered position, and such that when the first tank arrangement is in the lowered position, the second tank arrangement is in the raised position.

9. The power storage system of claim 8 wherein the at least one lower pulley is exactly two lower pulleys, the cable forming a W-shape with the first end fixed with the first tank arrangement and the second opposing end fixed with the second tank arrangement.

10. The power storage system of claim 1 wherein the upper pulley is fixed with a buoyant platform that floats on a surface of the body of water.

11. The power storage system of claim 1 wherein the at least one lower pulley is anchored to a floor of the body of water.

12. A method of storing power, comprising the steps:

a) providing a power storage system for use in a body of water, comprising:

a cable strung between at least one lower pulley and an upper pulley;

a tank arrangement comprising:

an outer tank disposed in the body of water and having an open bottom end, the outer tank fixed with the cable and configured to move between a lowered position and a raised position, the outer tank being of a weight so as to sink in the body of water when the outer tank has a minimum buoyancy and to rise in the body of water when the outer tank has a maximum buoyancy; and an inner tank disposed within the outer tank, the inner tank having at least one port through which the inner tank is in fluid communication with the outer tank, the at least one port including an air compressor configured to move air from the outer tank to the inner tank through the at least one port, and a dump valve configured to release compressed air within the inner tank into the outer tank, the air compressor running on power supplied to the power storage system; and at least one generator fixed with the upper pulley and configured to produce electricity when the outer tank and cable move between the lowered position and the raised position, at least a portion of the electricity used to deliver power from the power storage system;

b) with the outer tank in the raised position at the maximum buoyancy and substantially filled with air, and with the inner tank at a minimum internal air pressure, activating the air compressor in a compression mode to move air from the outer tank to the inner tank, increasing the internal air pressure of the inner tank and reducing an amount of air and the buoyancy of the outer tank;

c) the weight of the outer tank pulling the outer tank downwardly, the cable rotating the generator at the upper pulley to produce electricity, water entering the outer tank through the open bottom end thereof;

d) whereupon reaching the lowered position the outer tank obtaining the minimum buoyancy;

e) in a decompression mode the dump valve opening to allow air within the inner tank to exit the inner tank through the at least one port, the air entering the outer tank displacing the water in the outer tank out through the open bottom end thereof;

f) the buoyancy of the outer tank increasing to overcome the weight of the outer tank;

g) the cable rotating the generator at the upper pulley to produce electricity;

h) the outer tank reaching the raised position;

i) repeating from step b).

13. The method of claim 12 further including the steps:

a') designating the tank arrangement as a first tank arrangement, and providing a second tank arrangement fixed with the cable at an opposing side thereof, such that when the first tank arrangement is in the raised position the second tank arrangement is in the lowered position, and when the first tank arrangement is in the lowered position the second tank arrangement is in the raised position;

b') the second tank arrangement performing steps b) through i) but out of phase with the steps being performed by the first tank arrangement.

14. The method of claim 13 further including the steps:

a") connecting the inner tank of the first tank arrangement with the inner tank of the second tank arrangement through an air conduit and an electronic valve;

b") transferring air from either inner tank to an other inner tank through opening s the electronic valve.

* * * * *